United States Patent
Urban et al.

(10) Patent No.: US 6,726,181 B1
(45) Date of Patent: Apr. 27, 2004

(54) APPARATUS AND METHOD FOR ROUTING CABLES AND WIRES

(75) Inventors: Blake R. Urban, Lenior, NC (US); Isaac D. M. White, Orlando, FL (US); James E. Dickens, Ocoee, FL (US); Kevin Forsberg, Orlando, FL (US); Charles Sawyer, Orlando, FL (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 60 days.

(21) Appl. No.: 10/307,058

(22) Filed: Nov. 30, 2002

(51) Int. Cl.7 .............................................. E21C 29/16
(52) U.S. Cl. ...................... 254/134.3 R; 254/134.3 FT; 294/26; 15/104.3
(58) Field of Search ................. 254/134.3 R, 134.3 FT; 15/104.33, 104.16; 403/41, 76, 56, 115, 122; 29/149.5 B

(56) References Cited

U.S. PATENT DOCUMENTS

| | | | |
|---|---|---|---|
| 2,241,576 A | | 5/1941 | Barton |
| 2,410,753 A | | 11/1946 | Shinomiya |
| 3,625,084 A | | 12/1971 | Low |
| 3,950,934 A | * | 4/1976 | Irwin ........................... 57/223 |
| 4,033,618 A | | 7/1977 | Lamb |
| 4,077,609 A | | 3/1978 | MacFarlane |
| 4,272,860 A | | 6/1981 | Hinton |
| 4,273,111 A | | 6/1981 | Tsukaya |
| 4,771,500 A | * | 9/1988 | Kovacs ..................... 15/104.33 |
| 5,016,504 A | | 5/1991 | Brunnetto |
| 5,219,198 A | | 6/1993 | Davis |
| 5,297,443 A | | 3/1994 | Wentz |
| 6,293,519 B1 | * | 9/2001 | Farretta .............. 254/134.3 FT |
| 6,499,778 B2 | * | 12/2002 | Boulay ........................ 294/26 |

* cited by examiner

Primary Examiner—Joseph J. Hail, III
Assistant Examiner—Daniel Shanley
(74) Attorney, Agent, or Firm—Walters & Zimmerman

(57) ABSTRACT

An apparatus is disclosed for routing cables and wires. A first elongate section has an upper end and a lower end, and a second elongate section has a first end and a second end. A single hinge connects the lower end to the first end, and the single hinge allows the second elongate section to pivot between a first position to a second position. The first position has the second elongate section longitudinally aligned with the first elongate section, and the second position has the second elongate section substantially perpendicular to the first elongate section. The apparatus also has means for pivoting the second elongate section from the first position to the second position.

14 Claims, 11 Drawing Sheets

APPARATUS AND METHOD FOR ROUTING CABLES AND WIRES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to hand tools and, more particularly, to implements for pulling wires and cables.

2. Description of the Related Art

Implements have been used to install electrical wires and cables. These implements help route the wires and cables within conduits, walls, cavities, ceilings, and other spaces between structures. These implements utilize chains, ropes, and even an electrician's "snake" or "fish tape" to route the wires and cables.

Although these implements have long been used, these prior art implements have a common problem. These implements require two people to route the wire and cable. One person must work the implement at one location, while another person retrieves the implement, or wire, from a second location. Because two people are required, each installation incurs double the labor costs. Each two-person installation also delays another customer's service—the second technician is prevented from servicing another customer. There is, accordingly, a need for an implement that allows a single technician to install and route cables and wires.

BRIEF SUMMARY OF THE INVENTION

The aforementioned problems, and other problems, are reduced by an apparatus and method for routing cables and wires. This invention is an apparatus that allows a single technician to install wires and cables. The need for a second technician is greatly reduced. The technician lowers this invention into the space where the cables and/or wires are to be installed. The apparatus has features that easily and quickly allow the single technician to retrieve the apparatus at another location from within the space. Once the apparatus is retrieved, the cables and wires attach to the apparatus, and the apparatus is then used to pull the cables and wires along and through the space. Because this invention allows a single technician to install cables and wires, this invention reduces installation labor costs. Because the need for a two-person installation is greatly reduced, this invention also allows more customers to be serviced in a day, thus improving customer satisfaction.

One embodiment of this invention describes an apparatus for routing cables and wires. This apparatus comprises a first elongate section, a second elongate section, and a single hinge connecting the first elongate section to the second elongate section. The first elongate section has an upper end and a lower end, with the first elongate section defining a first longitudinal axis extending from the upper end to the lower end. The second elongate section has a first end and a second end, and the second elongate section defines a second longitudinal axis extending from the first end to the second end. The single hinge connects the lower end to the first end, and the single hinge allows the second elongate section to pivot between a first position to a second position. The first position has the second elongate section substantially longitudinally aligned with the first elongate section, and the second position has the second elongate section substantially perpendicular to the first elongate section. The apparatus also includes means for pivoting the second elongate section from the first position to the second position. The apparatus inserts into a space between existing structures and, when positioned at a desired location, the second elongate section is pivoted to the second position, wherein the second elongated section thus allows a user to locate the apparatus.

Another embodiment of this invention describes a method for routing cables and wires between structures. An apparatus is inserted into a space between existing structures, with the apparatus comprising a first elongate section, a second elongate section, and a single hinge. The first elongate section has an upper end and a lower end, with the first elongate section defining a first longitudinal axis extending from the upper end to the lower end. The second elongate section has a first end and a second end, with the second elongate section defining a second longitudinal axis extending from the first end to the second end. The single hinge connects the lower end to the first end. The method pivots the second elongate section from a first position to a second position. The first position has the second elongate section substantially longitudinally aligned with the first elongate section, and the second position has the second elongate section substantially perpendicular to the first elongate section.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
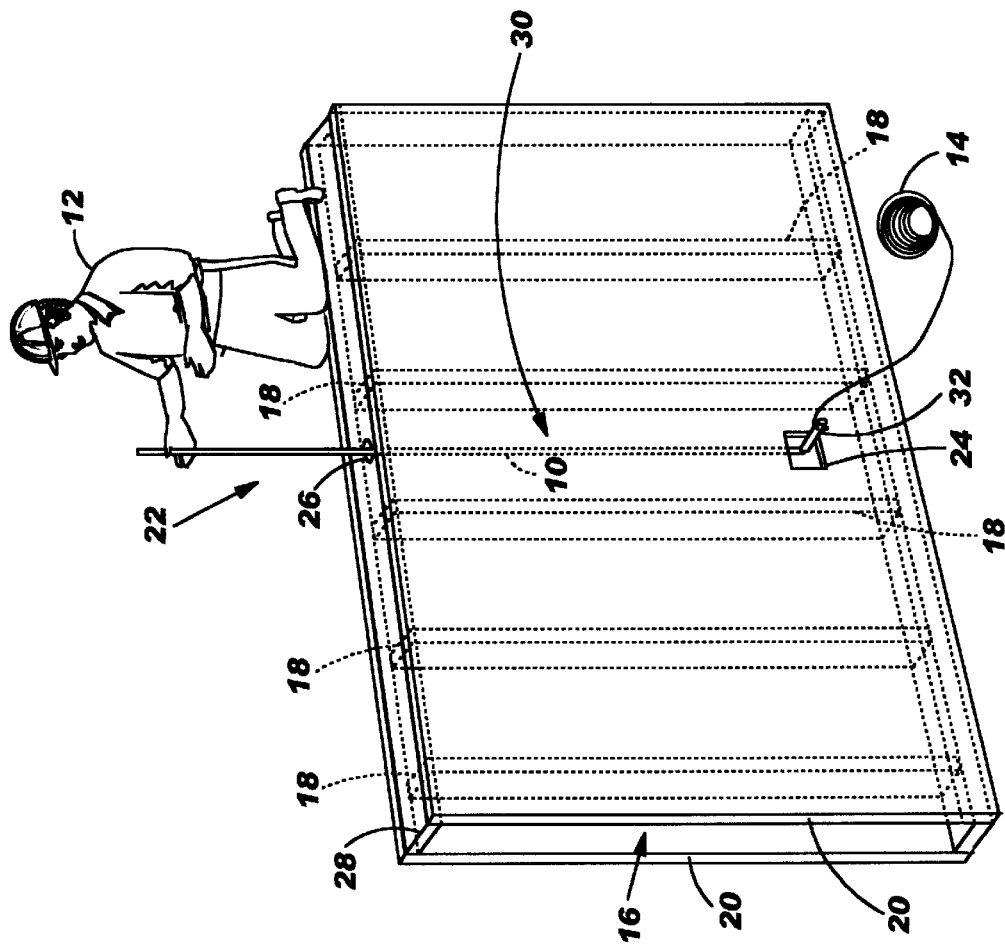
FIG. 1 is a schematic illustrating a typical use of an apparatus according to this invention.

FIG. 1 is a schematic illustrating a typical use of an apparatus 10 according to this invention. This apparatus 10 simplifies the installation and routing of cables and wires into spaces between existing structures. The apparatus has features that easily and quickly allow a single technician to install cables and wires. The apparatus inserts into a space between existing structures and aids a technician in routing cables and wires within the space. While the apparatus 10 may be used in many situations and in various structures, the apparatus is commonly used to route cables and wires between walls. FIG. 1, for example, shows a technician 12 using the apparatus 10 to install a cable 14 within a wall 16. The wall 16 comprises one or more studs 18 with a sheet rock face 20. The technician 12 desires to route, or "fish," the cable 14 within the wall 16 from an upper location 22 (such as an attic or an upper floor) to a lower cut-out 24 in the sheet rock 20. The cut-out 24 typically houses a terminal jack (not shown), and the cable 14 connects to the terminal jack.

As FIG. 1 shows, the technician 12 inserts the apparatus 10 into the wall 16. The technician 12 typically inserts the apparatus 10 through a hole 26 in an upper header 28. The apparatus 10 inserts into a space 30 within the sheet rock 20 and between adjacent studs 18. The technician 12 lowers the apparatus 10 to the approximate location of the lower cut-out 24 in the sheet rock 20. As this patent will later describe, the technician 12 is then able to pivot a lower section 32 of the apparatus 10. This lower section 32 of the apparatus 10 pivots to a substantially perpendicular position with respect to the sheet rock 20. When the apparatus 10 is correctly positioned within the space 30 between the sheet rock 20, the pivoted and perpendicular lower section 32 protrudes through the lower cut-out 24 in the sheet rock 20. The technician 12 may then climb down from the upper location 22 and attach the cable 14 to the pivoted lower section 32 of the apparatus 10. The technician 12 then returns to the upper location 22 and pulls the apparatus 10 through the hole 26 in the upper header 28. As the apparatus is pulled from the space 30 between the sheet rock 20, the attached cable 14 routes through the lower cut-out 24, upwardly through the space 30, and emerges through the hole 26 in the upper header 28. The apparatus 10 has thus allowed the single technician 12 to quickly install and route the cable 14 within the space 30 in the wall 16.

Figure 2:
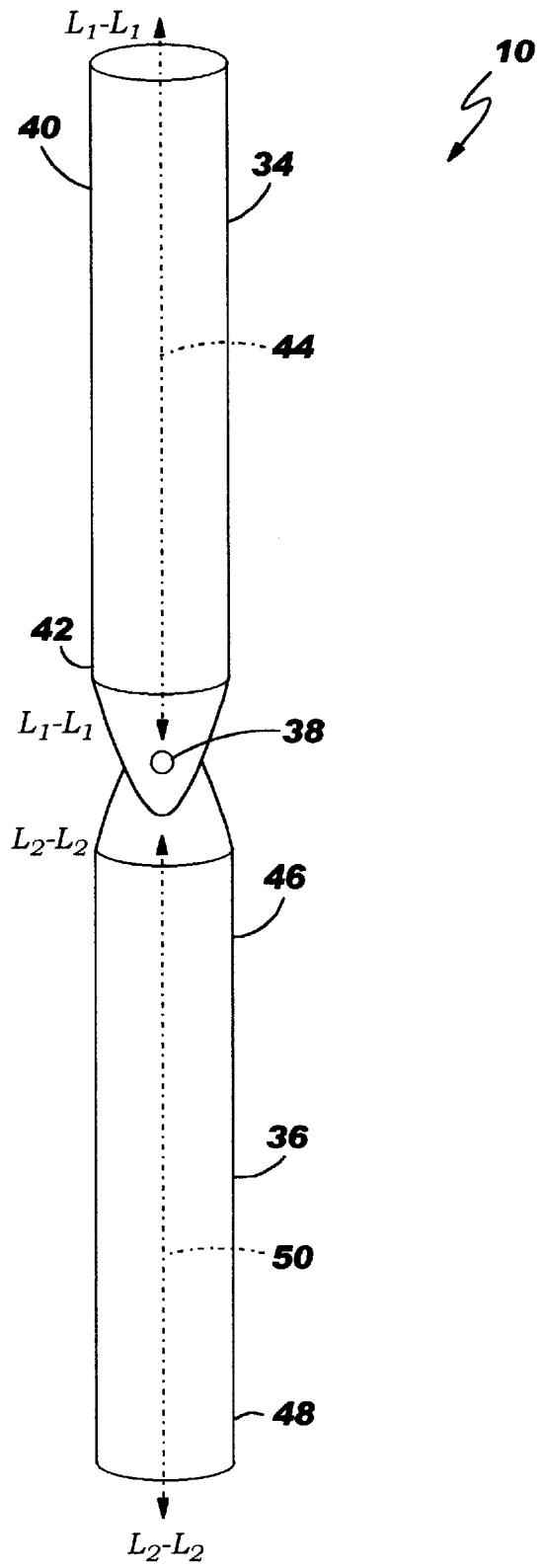
FIGS. 2 and 3 are more detailed schematics of the apparatus shown in FIG. 1.
Figure 3:
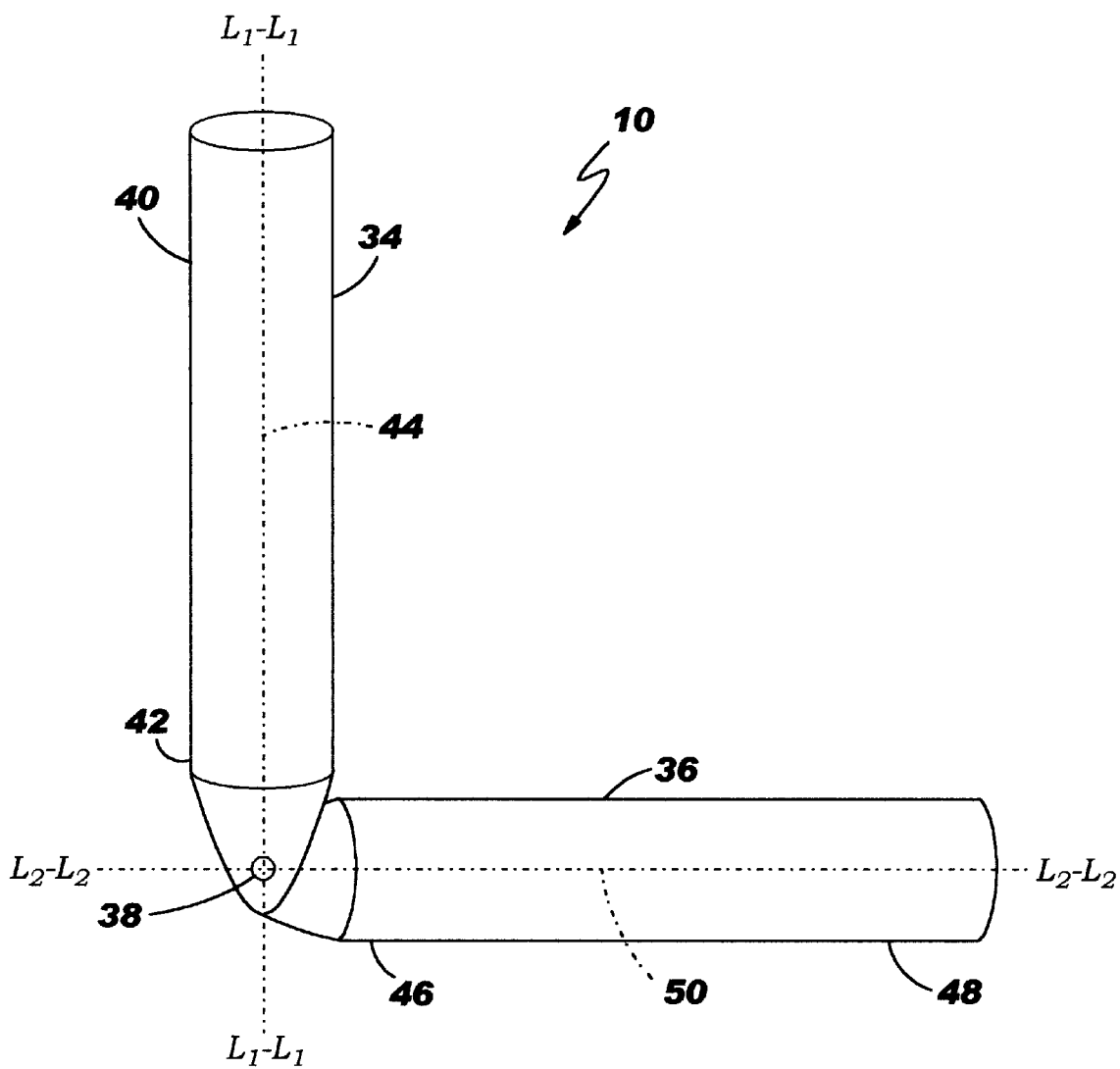

FIGS. 2 and 3 are more detailed schematics of the apparatus 10 shown in FIG. 1. The apparatus 10 comprises a first elongate section 34, a second elongate section 36, and a single hinge 38 connecting the first elongate section 34 to the second elongate section 36. The first elongate section 34 has an upper end 40 and a lower end 42. The first elongate section 34 defines a first longitudinal axis $L_1$—$L_1$ (shown as reference numeral 44). This first longitudinal axis $L_1$—$L_1$ extends from the upper end 40 to the lower end 42. The second elongate section 36 has a first end 46 and a second end 48. The second elongate section 36 defines a second longitudinal axis $L_2$—$L_2$ (shown as reference numeral 50). This second longitudinal axis $L_2$—$L_2$ extends from the first end 46 to the second end 48.

The single hinge 38 connects the first elongate section 34 to the second elongate section 36. The single hinge 38, in particular, connects the lower end 42 (of first elongate section 34) to the first end 46 (of the second elongate section 36). The single hinge 38 allows the second elongate section 36 to pivot from a first position to a second position. As this patent will later describe, the apparatus 10 also comprises means for pivoting the second elongate section 36 from the first position to the second position. FIG. 2 shows the first position has the second elongate section 36 substantially longitudinally aligned with the first elongate section 34. That is, the second longitudinal axis $L_2$—$L_2$ (shown as reference numeral 50) of the second elongate section 36 is parallel to the first longitudinal axis $L_1$—$L_1$ (shown as reference numeral 44) of the first elongate section 34.

FIG. 3 shows the second position of the second elongate section 36. The single hinge 38 allows the second elongate section 36 to pivot from the first position to the second position. The second position has the second elongate section 36 substantially perpendicular to the first elongate section 34. That is, the second longitudinal axis $L_2$—$L_2$ (shown as reference numeral 50) of the second elongate section 36 is substantially perpendicular to the first longitudinal axis $L_1$—$L_1$ (shown as reference numeral 44) of the first elongate section 34. When the apparatus 10 is inserted into the space, the technician lowers the apparatus 10 to a desired location. The technician 12 is then able to pivot the second elongate section 36 of the apparatus 10 to the second position. The pivoted and perpendicular second elongate section 36 helps the technician locate the apparatus 10 within the space.

Figure 4:
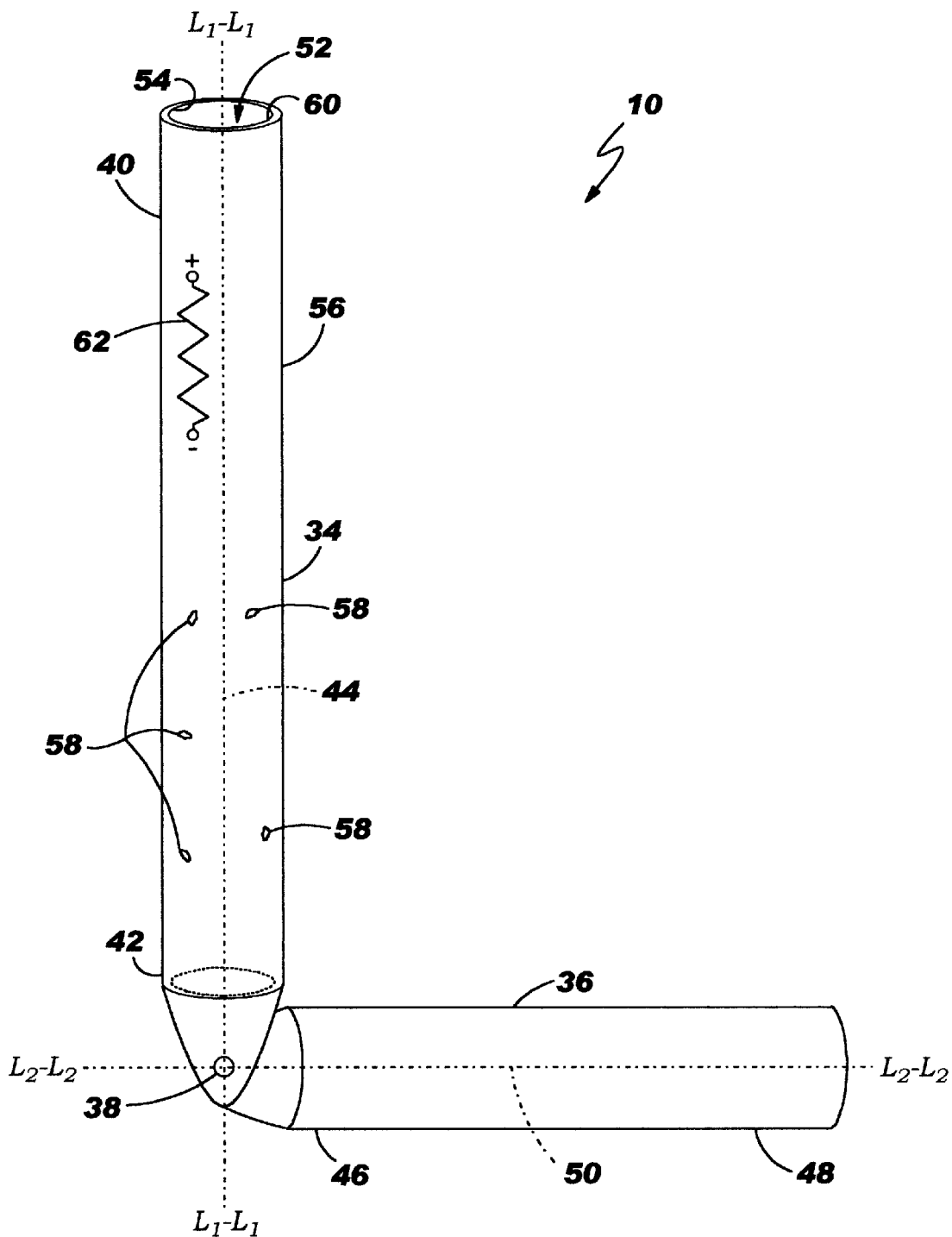
FIGS. 4–10 are schematics showing other embodiments of the apparatus according to this invention.

FIG. 4 is a schematic showing another embodiment of the apparatus 10 according to this invention. FIG. 4 shows the first elongate section 34 comprising an interior passage 52. This interior passage 52 extends from the upper end 40 to the lower end 42. The first elongate section 34 is thus a hollow member having the passage 52 bound by an inner wall 54. The inner wall 54 defines the first longitudinal axis $L_1$—$L_1$ (shown as reference numeral 44) of the first elongate section 34.

The interior passage 52 may be used to help locate the apparatus 10 within a space. If, for example, the first elongate section 34 comprises a transparent material and/or a translucent material 56, a source of light, shining down the interior passage 52, helps a technician locate the apparatus 10. Because the first elongate section 34 is hollow, light travels along the passage 52 and permeates the transparent and/or translucent material. When the apparatus 10 is inserted into the space, the permeating light radiates from the hollow, first elongate section 34. This permeating light helps the technician locate the apparatus 10 within the space. The first elongate section 34 may also comprise reflective particles 58 within the transparent material and/or translucent material to aid reflection of light. The inner wall 54 of the interior passage 52 may also comprise a reflective coating 60 to aid reflection of light along the interior passage 52. This source of light, shining down the interior passage 52, may be a flashlight aligned with the interior passage 52. More preferably, however, this embodiment of the apparatus 10 comprises a source of light 62. This source of light 62 directs light down the interior passage 52 to help a technician locate the apparatus 10. The source of light 62 may comprise a bulb, diode, liquid crystal, phosphorescence chemical, and/or any other means of emitting electromagnetic energy. Whatever the source of the light, the light is preferably within the visible spectrum.

Figure 5:
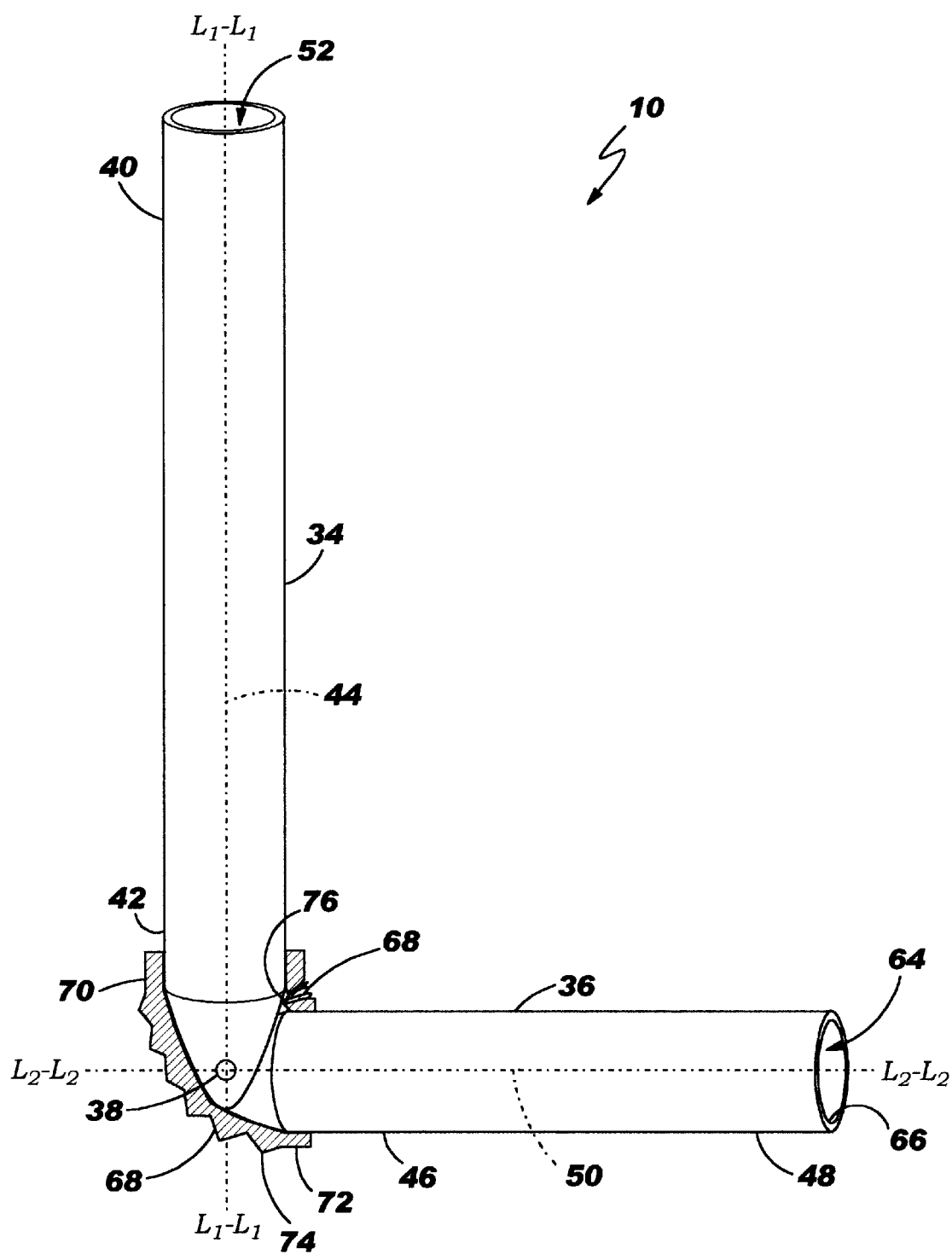

FIG. 5 is a schematic showing another embodiment of the apparatus 10 according to this invention. FIG. 5 shows the second elongate section 36 also comprising an interior passage 64. This interior passage 64 extends from the first end 46 to the second end 48. The second elongate section 36 is thus a hollow member having the passage 64 bound by an inner wall 66. The inner wall 66 defines the second longitudinal axis $L_2$—$L_2$ (shown as reference numeral 50) of the second elongate section 36. This embodiment may further comprise a flexible boot 68 surrounding the single hinge 38. The boot 68 has one end 70 attached to the lower end 42 of the first elongate section 34. The boot 68 has another end 72 attached to the first end 46 of the second elongate section 36. The boot 68 helps protect the single hinge 38 from contamination by dirt, sheet rock dust, stray insulation particles, and other debris. The boot 68, however, may also help direct light from the interior passage 52 of the first elongate section 34 to the interior passage 64 of the second elongate section 36. When the source of light shines along the interior passage 52, the boot 68 helps direct that light into and along the interior passage 64 of the second elongate section 36. The boot 68 may comprise a reflective material 74 and/or a reflective coating 76 to direct light from the lower end 42 to the first end 46 of the second elongate section 36. The boot 68 may also be constructed of transparent and/or translucent material that permits light to permeate the boot 68, thus further helping the technician locate the apparatus 10.

Figure 6:
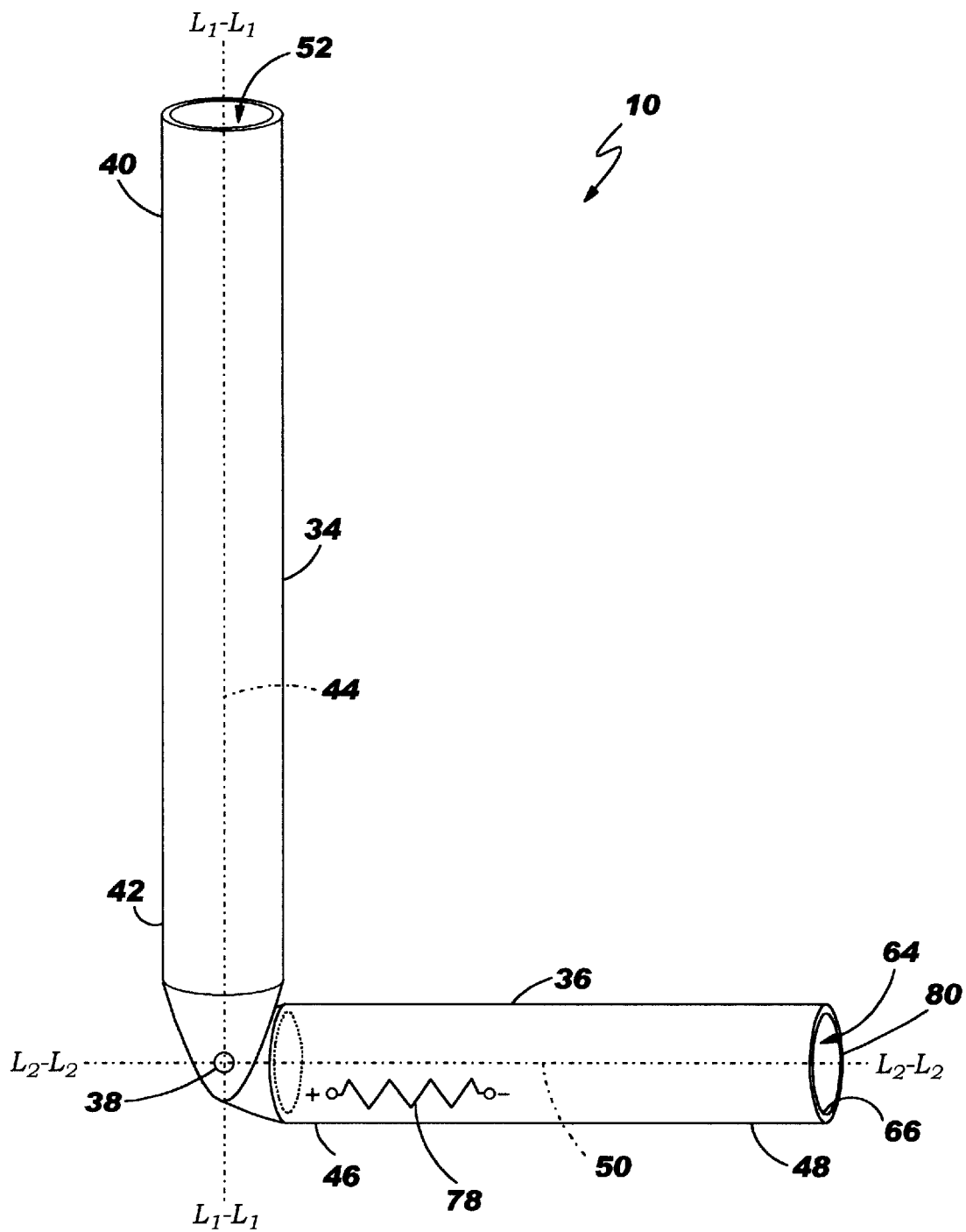

FIG. 6 is a schematic showing yet another embodiment of the apparatus 10 according to this invention. FIG. 6 shows the second elongate section 36 may also comprise a source of light 78 to help locate the apparatus 10 when inserted into the space between the existing structures. This source of light 78 preferably directs light along the interior passage 64 of the second elongate section 36. The source of light 78, additionally or alternatively, may be arranged to provide light to a tip 80 of the second elongate section 36. The source of light 78 may comprise a bulb, diode, liquid crystal, phosphorescence chemical, and/or any other means of emitting electromagnetic energy. Whatever the source of the light, the light is preferably within the visible spectrum to help locate the apparatus 10.

Figure 7:
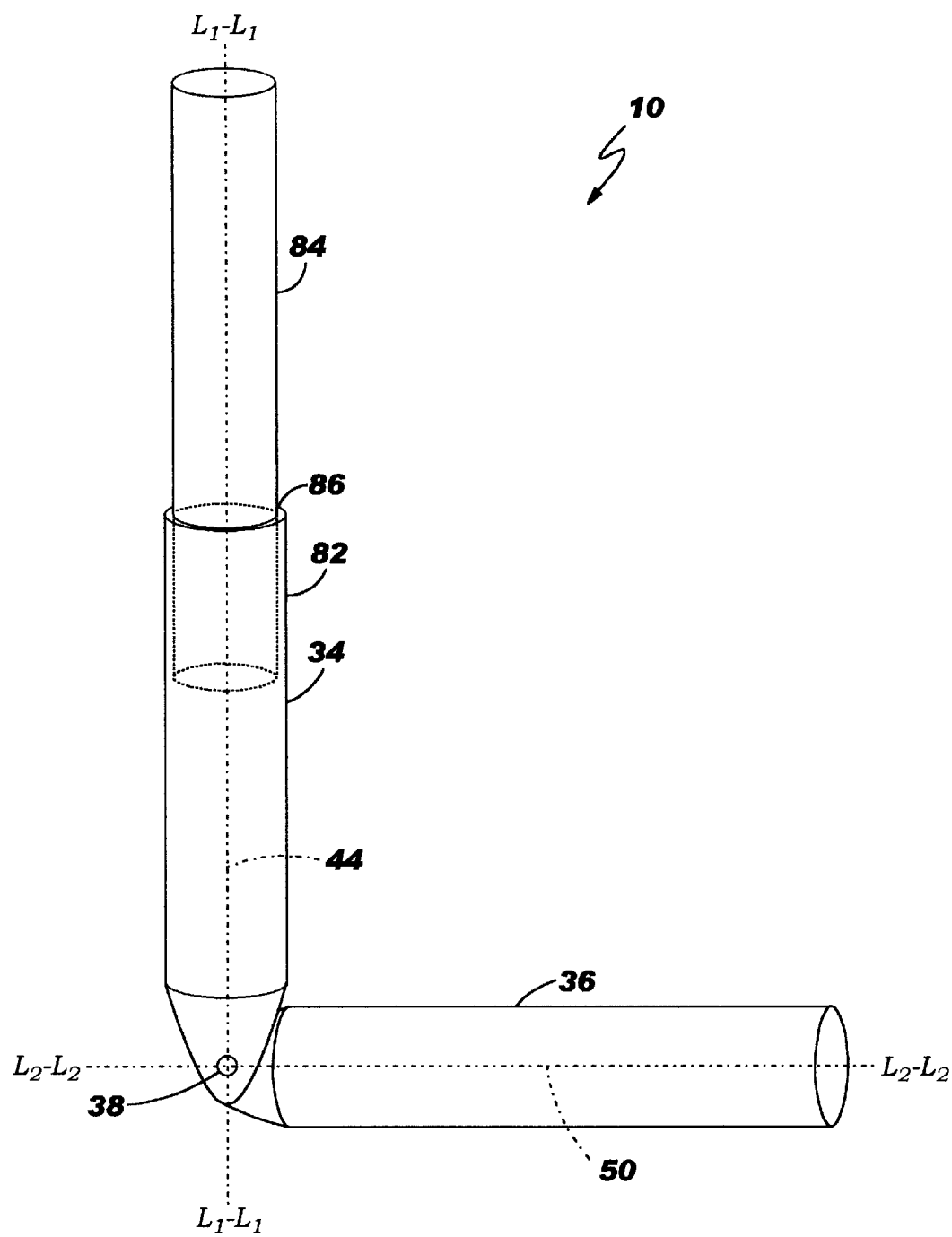

FIG. 7 is a schematic showing still another embodiment of the apparatus 10 according to this invention. FIG. 7 shows the first elongate section 34 may telescope in length to accommodate varying installation situations. This telescopic feature allows the technician to vary the length of the first elongate section 34. The telescopic first elongate section 34 has an outer section 82 and an inner section 84. The outer section 82 has a tubular cross-section 86, and the inner section 84 is sized such that the inner section 84 slides within the outer section 82. Although only one outer 82 and inner 84 section are shown, the telescoping first elongate section 34 may have successive pairs of inner and outer sections. The successive pairs of inner and outer sections are sized such that an inner section of one pair is also the outer section of an adjoining pair (e.g., similar to a telescopic antenna). This embodiment may also include a pin, detent, pawl, threading lock, threaded bolt, and/or any means of securing or of locking the inner section 84 within the outer section 82.

Figure 8:
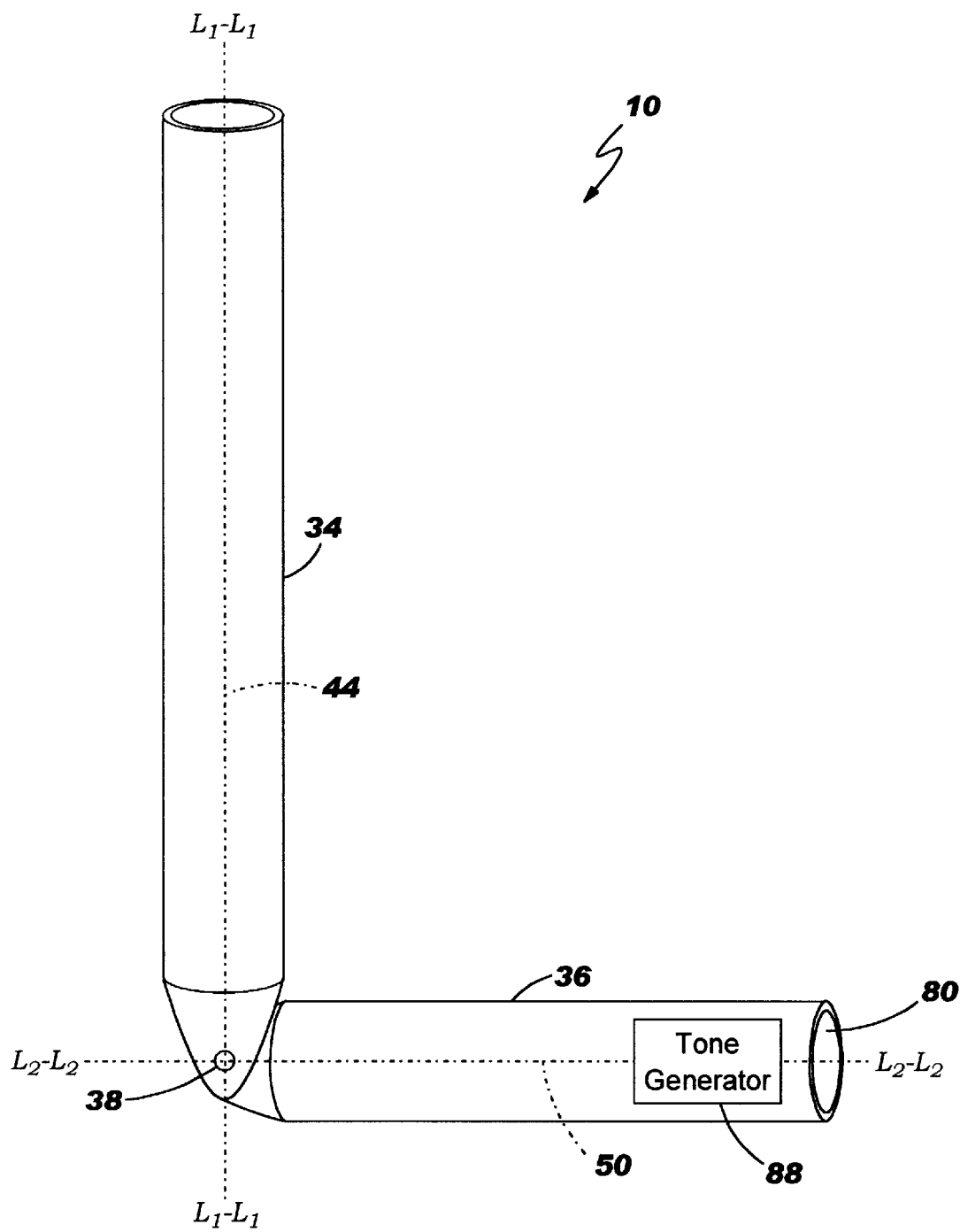

FIG. 8 is a schematic showing another embodiment of the apparatus 10 according to this invention. FIG. 8 shows the apparatus 10 may include a tone generator 88. This tone generator 88 helps locate the apparatus 10 when inserted into the space between the existing structures. The tone generator 88 may be arranged at any location along or within the apparatus 10, but the tone generator 88 is preferably located on or within the second elongate section 36. The tone generator 88 more preferably is arranged at the tip 80 of the second elongate section 36. The tone generator 88 may emit any frequency and tonal pattern, but the tone generator 88 preferably emits frequencies within an audible range. The tone generator 88 is preferably battery powered.

The second elongate section 36, as mentioned earlier, may pivot from the first position to the second position (as shown and discussed with reference to FIGS. 2 and 3). The single hinge 38 connects the first elongate section 34 to the second elongate section 36 and, thus, allows the second elongate section 36 to pivot from the first position to the second position. The apparatus 10 may, therefore, also comprise means for pivoting the second elongate section 36 from the first position to the second position.

Figure 9:
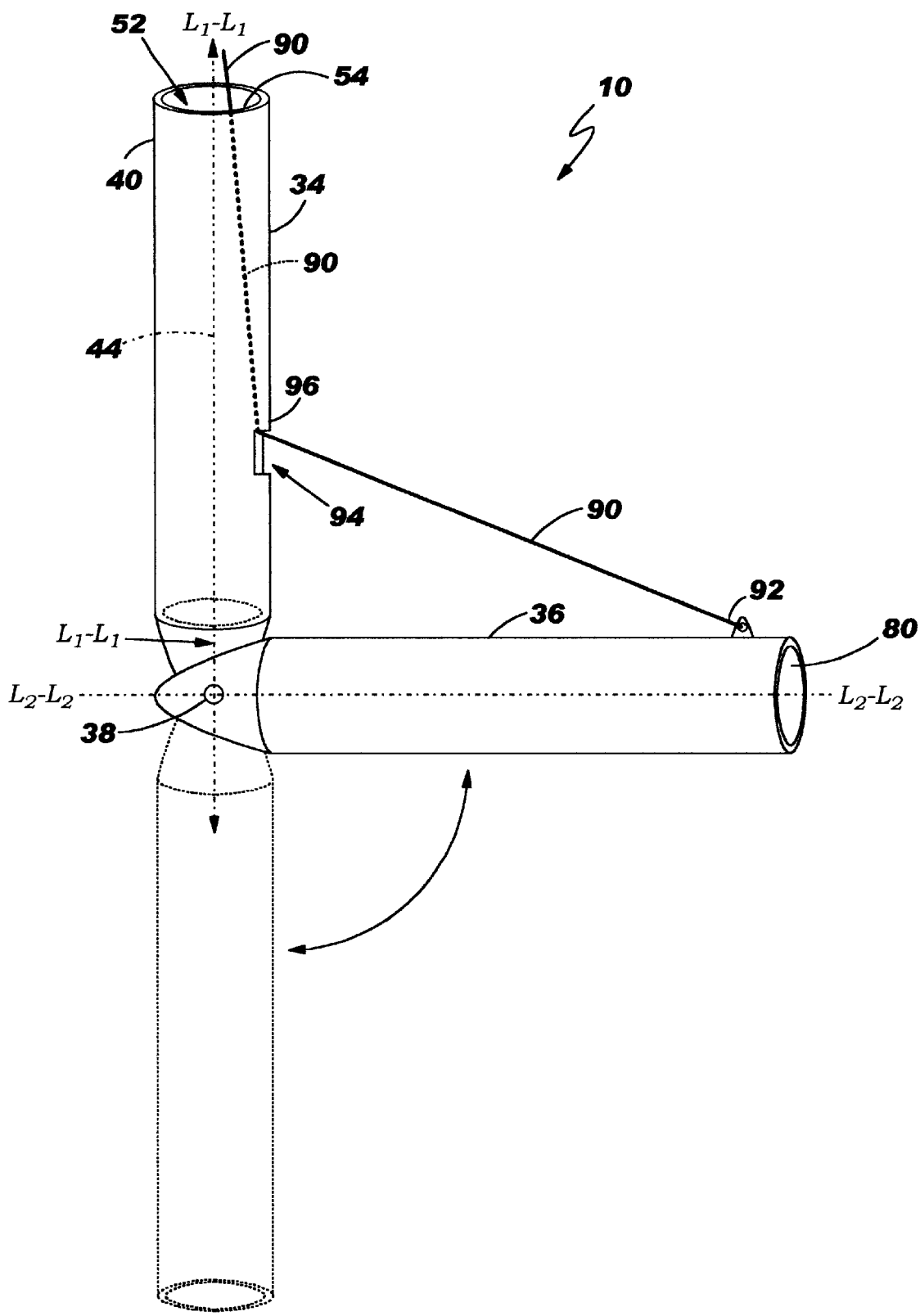

FIG. 9 is a schematic showing one means for pivoting the second elongate section 36. FIG. 9 shows apparatus 10 may include a string or cord 90 within the interior passage 52 of the first elongate section 34. This string or cord 90 has one end 92 attached to the second elongate section 36. The string or cord 90 routes through an aperture 94 in the first elongate section 34, within the interior passage 52, and out the upper end 40. When the apparatus 10 is inserted into the space between the existing structures, and lowered to the desired location, the technician may then pull the string or cord 90. When the string or cord 90 is pulled, the tension in the string or cord 90 causes the second elongate section 36 to pivot about the single hinge 38. The aperture 94 extends from the inner wall 54 to an outer wall 96 of the first elongate section 34. The aperture 94 may be located at any position along the first elongate section 34. Although the string or cord 90 may be attached at any position along the second elongate section 36, the string or cord 90 is preferably attached at or near the tip 80 of the second elongate section 36 to produce the greatest moment about the single hinge 38. As those of ordinary skill in the art may now recognize, any rod, tape, or "fish" could alternatively attach to the second elongate section 36, route through the interior passage 52, and exit out the upper end 40.

Figure 10:
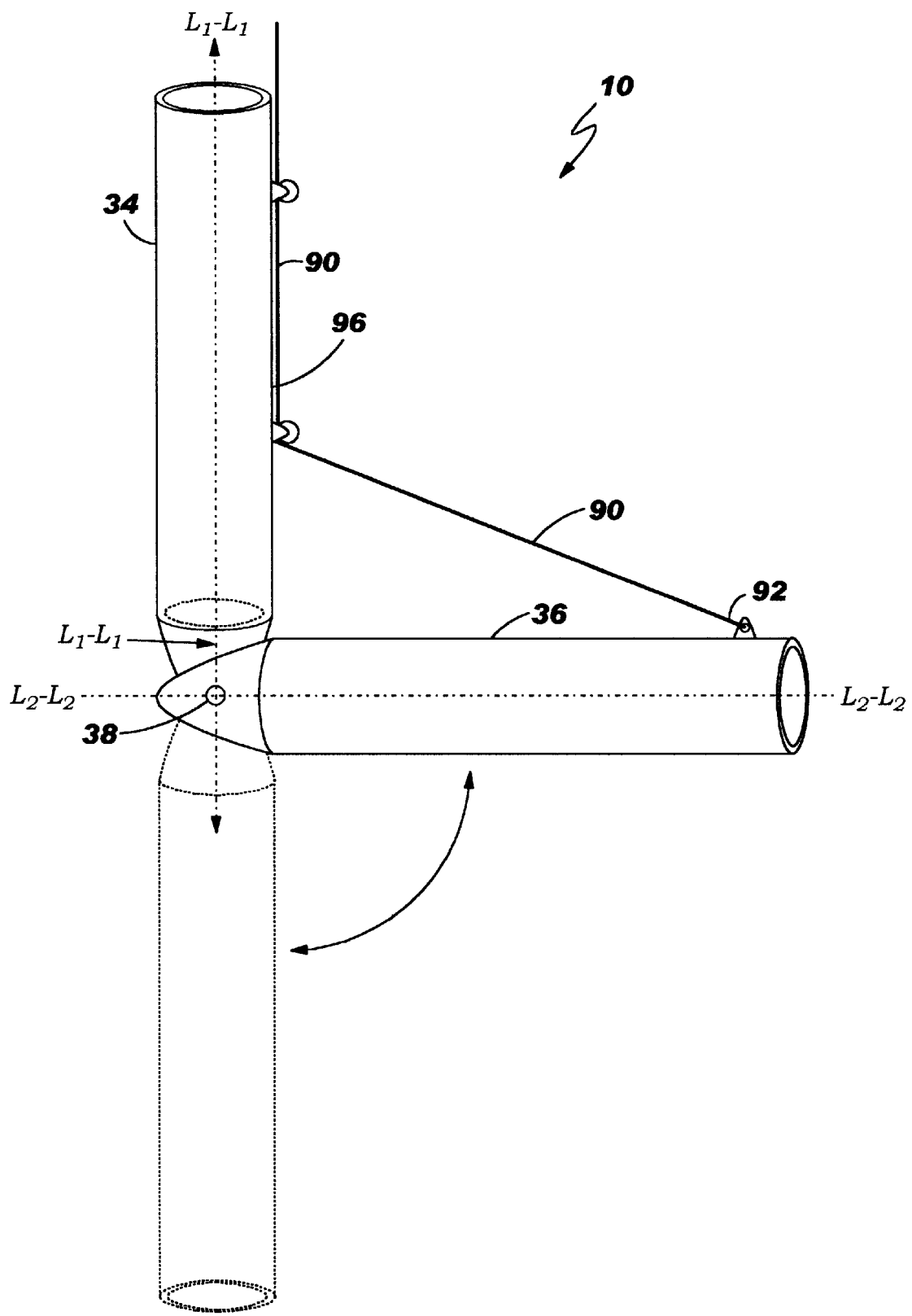

FIG. 10 is a schematic showing another means for pivoting the second elongate section 36. The string or cord 90 still has the one end 92 attached to the second elongate section 36. Here, however, the string or cord 90 exteriorly routes along the first elongate section 34. That is, the string or cord 90 does not route within the interior passage, but, instead, routes along or near the outer wall 96 of the first elongate section 34. Pulleys and/or guides may be used when routing the string or cord 90 along or near the outer wall 96. When the apparatus 10 is inserted into the space between the existing structures, the technician may pull the string or cord 90 the second elongate section 36 about the single hinge 38. Those of ordinary skill in the art also now recognize that any rod, tape, or "fish" could alternatively attach to the second elongate section 36 and route along or near the outer wall 96.

Figure 11:
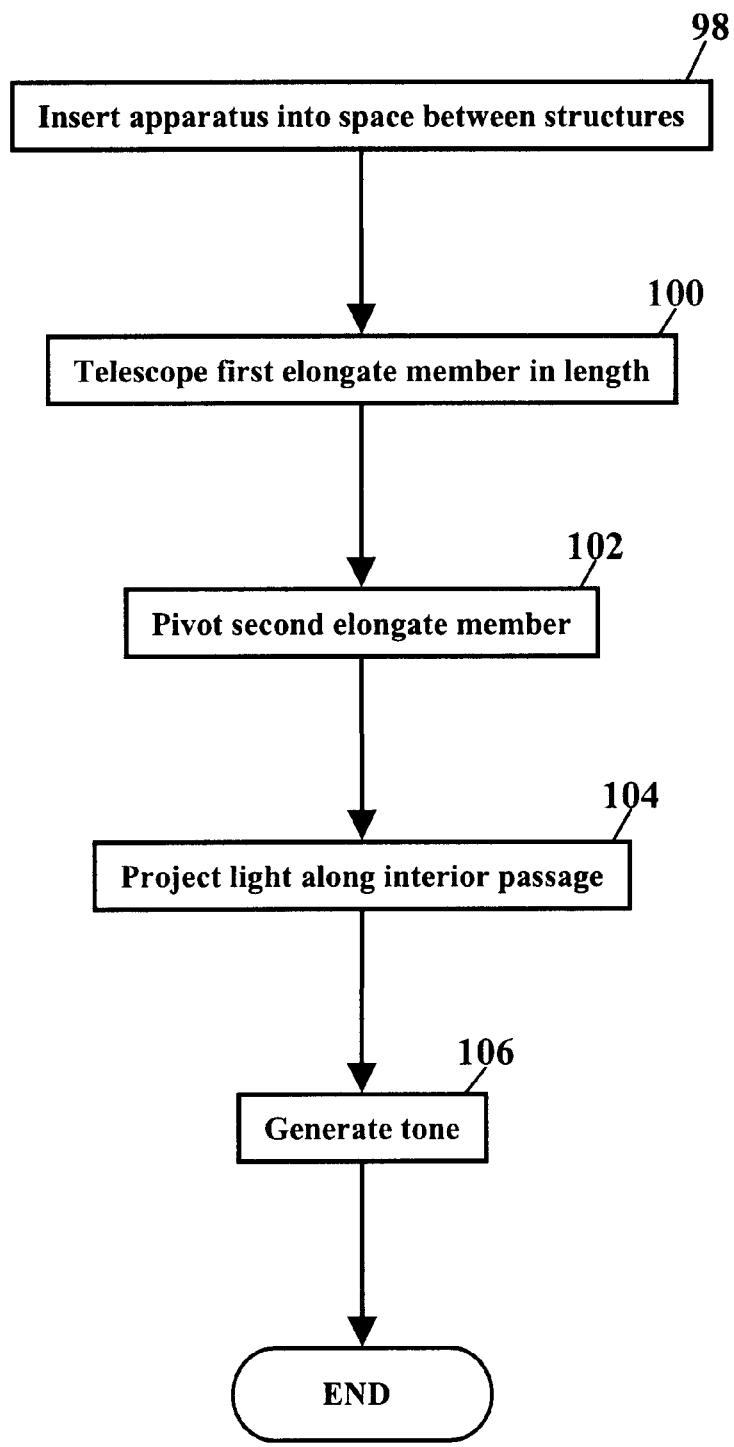
FIG. 11 is a flowchart illustrating a method for routing cables and wires.

FIG. 11 is a flowchart illustrating a method for routing cables and wires. An apparatus, comprising a first elongate section connected by a single hinge to a second elongate section, is inserted (Block 98) into a space between existing structures. The first elongate member may be telescoped in length (Block 100). The second elongate section pivots (Block 102) about the single hinge from a first position to a second position. The first position has the second elongate section substantially longitudinally aligned with the first elongate section, and the second position has the second elongate section substantially perpendicular to the first elongate section. Light may be projected (Block 104) along an interior passage of the apparatus to help locate the apparatus. A tone may also be generated (Block 106) to help locate the apparatus.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. An apparatus for routing cables and wires, comprising:
    a first elongate section having an upper end, a lower end, and a hollow member having a passage extending from the upper end to the lower end, the passage bound by an inner wall, the inner wall defining a longitudinal axis extending from the upper end to the lower end;
    a second elongate section having a first end and a second end, the second elongate section defining a second longitudinal axis extending from the first end to the second end; and
    a single hinge connecting the lower end to the first end, the single hinge allowing the second elongate section to pivot between a first position to a second position, the first position having the second elongate section substantially longitudinally aligned with the first elongate section, and the second position having the second elongate section substantially perpendicular to the first elongate section, wherein the apparatus is inserted into a space between existing structures and, when positioned at a desired location, the second elongate section is pivoted to the second position, wherein the second elongated section thus allows a user to locate the apparatus.

2. An apparatus according to claim 1, further comprising a source of light projecting visible light along the passage, the source of light to help locate the apparatus when inserted into the space between the existing structures.

3. An apparatus according to claim 2, wherein the first elongate section comprises at least one of i) a transparent material and ii) a translucent material, the first elongate section permeable to the visible light.

4. An apparatus according to claim 1, wherein the second elongate section comprises a hollow member having a passage extending from the first end to the second end, the passage bound by an inner wall, and the inner wall defines the longitudinal axis.

5. An apparatus according to claim 4, further comprising a flexible boot surrounding the single hinge, the boot having one end attached to the lower end and another end attached to the first end.

6. An apparatus according to claim 5, wherein the boot comprises a reflective material capable of reflecting light from the lower end to the first end.

7. An apparatus according to claim 1, wherein the first elongate member has a tubular cross-section and an inner section sliding within an outer section, the first elongate member telescoping in length.

8. An apparatus according to claim 1, further comprising a source of light to help locate the apparatus when inserted into the space between the existing structures.

9. An apparatus according to claim 1, wherein the second elongate section comprises a source of light to help locate the apparatus when inserted into the space between the existing structures.

10. An apparatus according to claim 1, further comprising a tone generator to help locate the apparatus when inserted into the space between the existing structures.

11. An apparatus according to claim 1, further comprising means for pivoting the second elongate section from the first position to the second position.

12. A method for routing cables and wires, comprising:

inserting an apparatus into a space between existing structures, the apparatus comprising a first elongate section, a second elongate section, and a single hinge, the first elongate section having an upper end and a lower end, with the first elongate section defining a first longitudinal axis extending from the upper end to the lower end, the second elongate section having a first end and a second end, with the second elongate section defining a second longitudinal axis extending from the first end to the second end, the single hinge connecting the lower end to the first end;

pivoting the second elongate section from a first position to a second position, the first position having the second elongate section substantially longitudinally aligned with the first elongate section, and the second position having the second elongate section substantially perpendicular to the first elongate section; and projecting visible light along an interior passage of the apparatus to help locate the apparatus when inserted into the space between the existing structures.

13. A method according to claim 12, further comprising projecting visible light from the second elongate section to help locate the apparatus when inserted into the space between the existing structures.

14. A method for routine cables and wires, comprising:

inserting an apparatus into a space between existing structures, the apparatus comprising a first elongate section, a second elongate section, and a single hinge, the first elongate section having an upper end and a lower end, with the first elongate section defining a first longitudinal axis extending from the upper end to the lower end, the second elongate section having a first end and a second end, with the second elongate section defining a second longitudinal axis extending from the first end to the second end, the single hinge connecting the lower end to the first end;

pivoting the second elongate section from a first position to a second position, the first position having the second elongate section substantially longitudinally aligned with the first elongate section, and the second position having the second elongate section substantially perpendicular to the first elongate section; and generating a tone to help locate the apparatus when inserted into the space between the existing structures.

\* \* \* \* \*